United States Patent [19]

Bhagwat et al.

[11] Patent Number: 4,835,409
[45] Date of Patent: May 30, 1989

[54] CORDED/CORDLESS DUAL-MODE POWER-OPERATED DEVICE

[75] Inventors: Pradeep M. Bhagwat; Donald E. Elson, both of Baltimore; Richard T. Walter, Baldwin, all of Md.

[73] Assignee: Black & Decker Inc., Newark, Del.

[21] Appl. No.: 160,912

[22] Filed: Feb. 26, 1988

[51] Int. Cl.$^4$ ............................................. H02J 7/00
[52] U.S. Cl. ...................................... 307/64; 307/43; 15/DIG. 1
[58] Field of Search ................... 307/64, 66, 43, 80; 310/50; 15/DIG. 1; 320/2

[56] References Cited

U.S. PATENT DOCUMENTS

| 2,590,805 | 3/1952 | Vitale | 307/150 |
|---|---|---|---|
| 2,721,946 | 10/1955 | Weisberger et al. | 307/43 |
| 3,174,048 | 3/1965 | Snyder et al. | 307/43 |
| 3,267,510 | 8/1966 | Cote | 15/344 |
| 3,525,912 | 8/1970 | Wallin | 310/50 X |
| 3,769,571 | 10/1973 | Wilkinson | 307/64 X |
| 3,790,810 | 2/1974 | Rogers et al. | 307/66 |
| 3,968,417 | 7/1976 | Dials | 320/2 |
| 4,187,536 | 2/1980 | Govaert et al. | 363/21 |
| 4,196,469 | 4/1980 | Gurwicz | 363/37 X |
| 4,227,243 | 10/1980 | Gurwicz et al. | 363/132 |
| 4,300,087 | 11/1981 | Meisner | 320/2 |
| 4,333,134 | 6/1982 | Gurwicz | 363/17 |
| 4,353,112 | 10/1982 | Rietveld et al. | 363/16 |
| 4,472,672 | 9/1984 | Pacholok | 320/21 |
| 4,507,720 | 3/1985 | Colbrese | 363/13 |
| 4,528,459 | 7/1985 | Wiegel | 307/66 |
| 4,564,800 | 1/1986 | Jurjans | 320/36 |
| 4,607,208 | 8/1986 | Vreeland | 320/21 |

Primary Examiner—William M. Shoop, Jr.
Assistant Examiner—Sharon D. Logan
Attorney, Agent, or Firm—J. Bruce Hoofnagle; Edward D. Murphy; Harold Weinstein

[57] ABSTRACT

A corded/cordless dual-mode power-operated device, such as a household vacuum cleaner, can be operated in corded mode from a conventional power source and in a cordless mode using energy provided from an internal rechargable battery and which includes an internal battery charger for recharging the battery when the device is in its corded mode. The internal charger includes a voltage converter that converts input source current to a relatively high DC current that is chopped at a comparatively high frequency, e.g., 25 KHz, by switching devices. The high-frequency, high voltage current is presented to a step-down transformer with the stepped-down output rectified to provide a low-voltage DC suitable for recharging the internal battery when the device is in its corded mode. The voltage converter advantageously provides for the high efficiency conversion of the input energy to meet the charging current demands of the internal battery in a physically compact device.

11 Claims, 3 Drawing Sheets

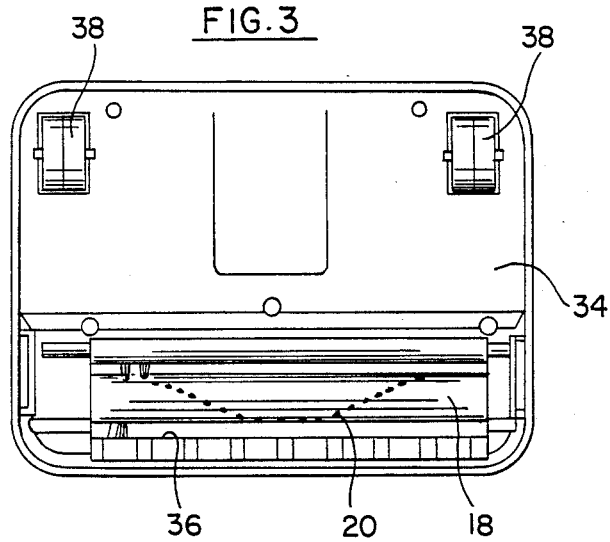
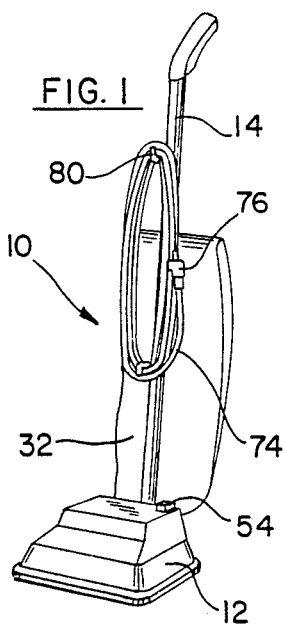
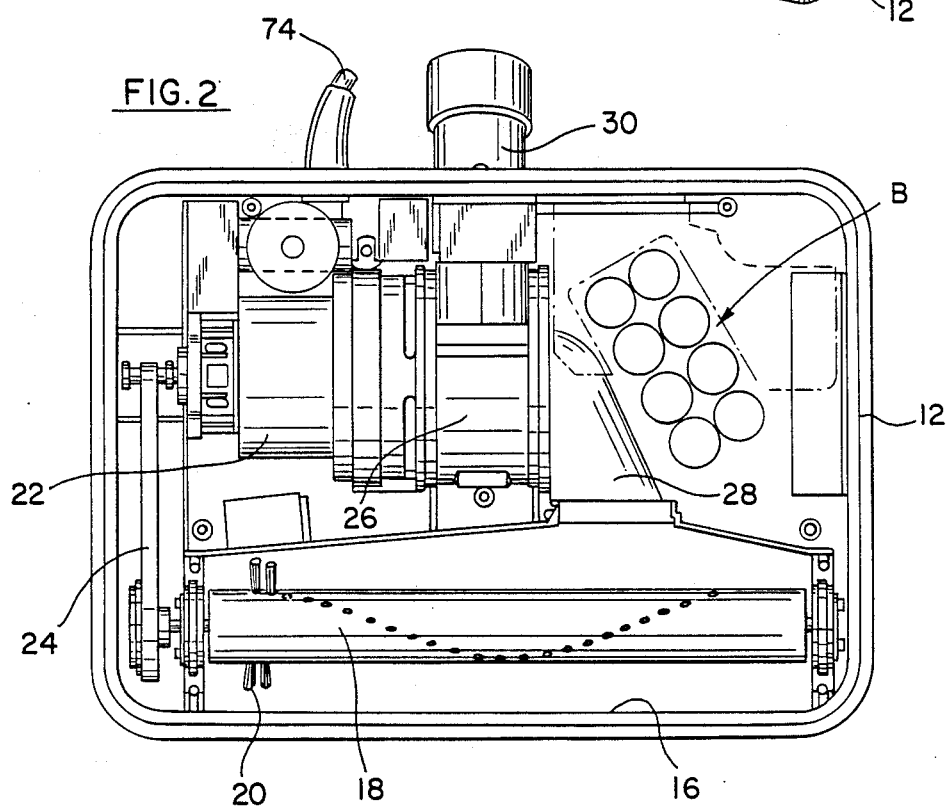

CORDED/CORDLESS DUAL-MODE POWER-OPERATED DEVICE

CROSS REFERENCE TO RELATED APPLICATIONS

The subject matter of the present application is related to that disclosed in co-pending and commonly assigned U.S. patent application Ser. No. (Black & Decker Case 4787), filed on even date herewith and entitled "Voltage Converter" and U.S. patent application Ser. No. (Black & Decker Case P-US-TN-0126), filed on even date herewith and entitled "Dual-Mode Corded/Cordless System for Power-Operated Devices."

BACKGROUND OF THE INVENTION

The present invention relates to electrically operated devices and appliances and, more particularly, to a power-operated device which can operate in a cordless mode from a self-contained power source or in a corded mode from a conventional AC or DC power source.

Various designs have been developed for electrically operated devices and appliances that receive their electrical energy from a rechargeable battery. In some systems, the rechargable battery is contained within the device housing as non-removable component, and battery charging is effected by mechanically and electrically connecting the device to a self-standing charger that provides charge current through an electrical connection interface. In addition to designs which provide a charger as a separate self-standing unit, the charger can take the form of a unit that is plugged into a conventional wall outlet and connected to the device to be charged by a plug-type connector. In other systems, the rechargeable battery is contained within a removable battery pack that is normally contained, for example, in the handle portion of the device and removed for connection to the charger unit. Lastly, some designs provide for the rechargable battery and an internal battery charger as non-removable components within the device housing. The device can be operated in a corded mode from a conventional wall outlet, in a cordless mode during which the device is powered by its battery, and in charge mode during which the internal charger functions to charge the battery. The devices which employ internal chargers have typically been low-power devices, such as hand-held calculators, portable computers, and radio transceivers.

Advances in battery technologies and systems have led to the development of physically compact and electrically efficient batteries that store a relatively large amount of electrical energy. These higher energy batteries have permitted the development of higher power cordless devices that operate at power levels above 50 watts, including power levels that extend to 500 watts or so. These higher power devices include, for example, portable hand-held power tools and appliances such as drills, screwdrivers, screwdriver-drills, hammer-drills, jig saws, circular saws, shears, hedge trimmers, and various household products and appliances including vacuum cleaners.

Certain design criteria are presented when designing an internal battery charger for charging the battery associated with cordless power devices. In low power systems, a corresponding low-current charger can be readily provided which presents a low-current to the battery with recharging effected over many hours. Since the powered devices typically operate in the 3-48 volt DC range, a step-down transformer is typically used to step the 120 or 220/240 VAC input current to a lower level for rectification to a DC value suitable for battery recharging. In the low current chargers, relatively small and inexpensive components are available to effect the voltage conversion to allow the incorporation of the charger circuitry into the cordless device as an internal charger. As the quantity of electrical energy stored in the battery increases, the corresponding size and cost of the electrical components for the charger, especially the step-down transformer, increases proportionately. Accordingly, the corresponding increase in the physical size of the charger components for a reasonable charge current tends to define a practical limit for the incorporation of the charger in the cordless device as an internal charger. Thus the incorporation of an internal charger into a low-power device, such as a hand-held calculator, represents a reasonable design choice because of the small physical size and low cost of the charger components. However, the incorporation of an internal charger in a higher power devices, such as high power motorized devices including power tools and household appliances, requires the need to incorporate high current devices, particularly the step-down transformer, into the cordless device. As can be appreciated, the incorporation of such devices adds to the weight of the device and represents a design constraint in providing a compact device. Thus in high-power dual-mode corded/cordless devices, a practical design constraint exists with regard to the incorporation of an internal charger which does not compromise the utility of the device.

SUMMARY OF THE INVENTION

In view of the above, it is an object of the present invention, among others, to provide corded/cordless dual-mode power-operated devices that include an internal battery charger that can provide the necessary power and current requirements for efficiently charging the internal battery of the high power device.

It is another object of the present invention to provide corded/cordless dual-mode power-operated devices having a compact internal battery charger that can provide the necessary power and current requirements for efficiently charging the internal battery without presenting undue constraints in the design of the power operated device.

It is a further object of the present invention to provide corded/cordless dual-mode power-operated devices that can operate in a cordless mode from power supplied by an internal rechargable battery and in a corded mode from a conventional power source and which includes a compact and cost efficient internal charger for recharging the internal battery when the device is in its corded mode.

It is a further object of the present invention to provide corded/cordless dual-mode power-operated devices that can operate in a cordless mode from power supplied by an internal rechargable battery and in a corded mode from a conventional power source and which includes an internal battery charger in which the weight, size, and utility of the device is not compromised by the presence of the internal charger.

In view of these objects, and others, the present invention provides a corded/cordless dual-mode power-operated device that can be operated in corded mode from a conventional power source and in a cordless mode using energy provided from an internal rechargable battery and which includes an internal battery charger for recharging the battery when the device is in its corded mode. The internal charger includes a voltage converter that converts input source voltage, such as 120 or 240 volts AC or DC, to a relatively high DC voltage that is chopped at a comparatively high frequency, e.g., 25 KHz, by switching devices and presented to the primary of a step-down transformer. The output of the step-down transformer is presented to a controlled impedance in series circuit with the battery to control the charge current to the battery. The provision of a voltage converter operating at a relatively high frequency allows the use of a lightweight and physically compact transformer that nonetheless provides a high output current for charging.

The present invention advantageously provides a corded/cordless dual-mode power-operated device having an internal battery charger and high efficiency converter circuitry associated with the battery charger that successfully meets the charging current demands of the internal battery in a physically compact and electrically efficient device.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is a view of a power operated device in accordance with the present invention;

FIG. 2 is a bottom view of the power operated device with a cover removed to reveal interior components;

FIG. 3 is a bottom view of the power operated device of FIG. 1 with a cover assembled to the bottom of the power operated device;

DESCRIPTION OF THE PREFERRED EMBODIMENT

Figure 4:
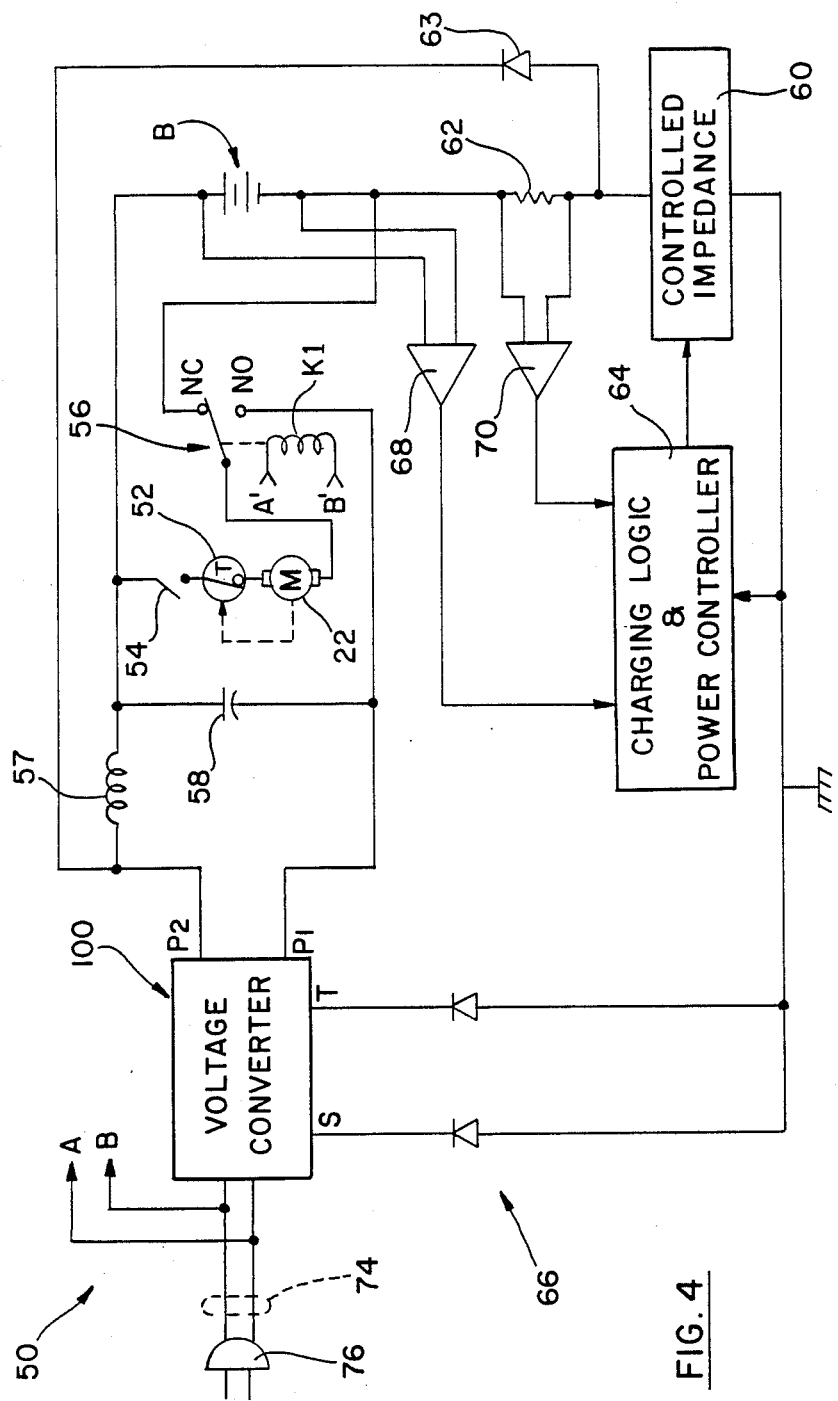
FIG. 4 is a functional block diagram of a power and charging circuit for operating the device of FIG. 1 in either a corded or cordless mode.

An exemplary corded/cordless dual-mode power-operated device in the form of an upright vacuum cleaner is shown in FIG. 1 and designated generally therein by the reference character 10. As shown, the vacuum cleaner 10 includes a base housing 12 and a handle 14 pivotally mounted to the housing 12. As shown in FIG. 2, the underside of housing 12 is formed with a brush chamber 16 which contains a rotatably mounted brush 18 that includes outwardly extending bristles 20. A low voltage D.C. motor 22 is also mounted within housing 12 and is coupled to and drives the brush 18 through a flexible belt 24. The motor 22 also rotates a vacuum fan (not shown) that is contained within a fan housing 26. A vacuum horn 28 is interposed between the fan housing 26 and a vacuum outlet 30. The vacuum horn 28 communicates with the brush chamber 16 and a debris collection bag 32 (FIG. 1) that is attached to the vacuum outlet 30. A battery B is mounted in the housing 12 and provides electrical power to the motor 22 in the cordless operating mode as explained below in relationship to FIGS. 4 and 5. In the preferred form, the battery B is formed from a plurality of appropriately interconnected Nickel-Cadmium cells (unnumbered). The cells are arranged and connected within the battery B to provide a low-level DC voltage compatible with the operating DC voltage supply level of the motor 22, for example, 12 volts. This voltage supply level is normally associated with a cordless mode of operation for a power-operated device, although the voltage supply level could be in a range of 3.6 to 48 volts DC without departing from the spirit and scope of the invention.

As the vacuum cleaner 10 is moved over a surface to be cleaned, such as a carpet (not shown), the bristles 20 dislodge dirt particles from the carpet with the particles entrained in the air flow and drawn into the brush chamber 16. The particles are then drawn through the vacuum horn 28, the fan housing 26, and the outlet 30 into the debris collection bag 32 in the conventional manner.

As illustrated in FIG. 3, a cover 34 is attached to the underside of the housing 12 to conceal most of the components contained within the housing 12. The cover 34 is formed with an opening 36 through which the ends of the bristles 20 of the rotatable brush 18 extend. A pair of rotatable rear rollers 38 are mounted on the cover 34 and facilitate convenient movement of the vacuum cleaner 10.

As shown in the functional block diagram of FIG. 4, the dual-mode vacuum cleaner 10 includes a power circuit, indicated in general form by the reference character 50, for powering the motor 22 in a corded mode from a conventional power source or a cordless mode from the battery B and for charging the battery B for use during the cordless mode. As shown, the power circuit 50 includes the motor 22 in series circuit with a thermal switch 52 and an ON/OFF switch 54 which is physically located as a foot switch on the upper exterior surface of the base housing 12 as illustrated in FIG. 1. The thermal switch 52 is in a heat conducting relationship with the motor 22 along a heat conduction path (indicated in dotted line) and functions to open the circuit to the motor 22 if an over-temperature situation is sensed. The battery B is in series circuit with the ON/OFF switch 54 and the single-pole double-throw (SPDT) contacts 56 of a relay K1. The moveable pole of the contacts 56 is connected to the motor 22 on the side opposite the thermal switch 52 and is normally in circuit with the normally closed contact NC and is selectively moved to effect connection with the normally open contact NO under the control of the coil of the relay K1.

Figure 5:
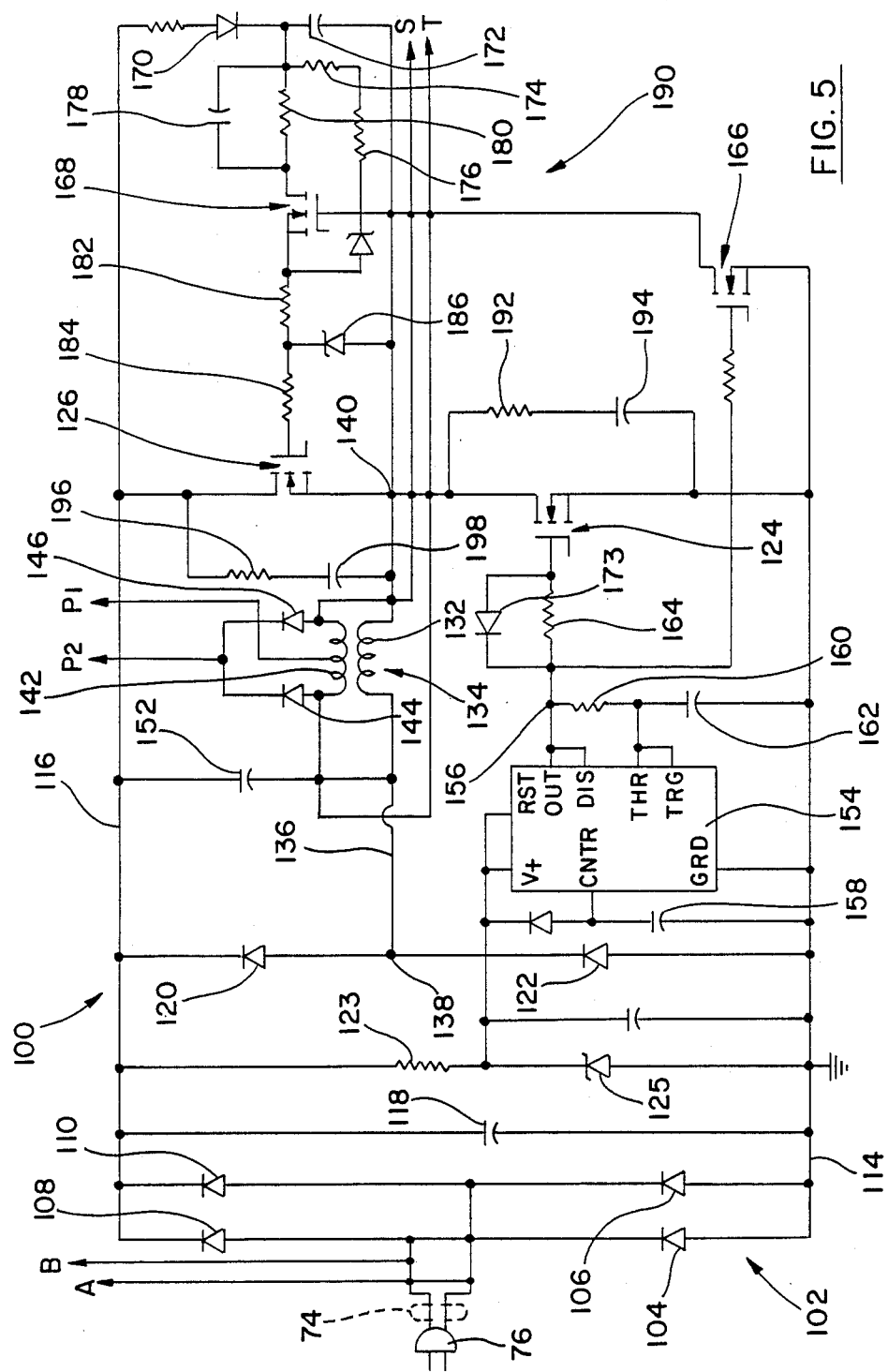
FIG. 5 is a circuit diagram of voltage converter portion of the block diagram of FIG. 4.

A voltage converter 100, described more fully below in relationship to FIG. 5, is connected from an output P1 to the normally open contact NO of the relay contacts 56. An output P2 of the converter 100 is connected through a coil 57 to the negative side of the battery B and to the ON/OFF switch 54. A capacitor 58 is connected at one side thereof to a node between the coil 57 and the positive side of the battery B at the other side thereof to the output P1 of the converter 100. The battery B is charged through a circuit that includes a controlled impedance 60 in series circuit between chassis ground and the negative side of the battery B through a resistor 62. A diode 63 is connected between the output P2 of the converter 100 and a node between the resistor 62 and the controlled impedance 60.

The controlled impedance 60 is operated in response to a charging logic and power controller 64 which receives its operating power through a diode half-bridge 66 through AC outputs S and T of the voltage converter 100. An operational amplifier 68 has its inputs connected across the battery B to provide an indication of battery B voltage to the charging logic and power controller 64, and another operational amplifier 70 is connected across the series resistor 62 to provide a charging current indication to the charging logic and power controller 64.

In the preferred embodiment, the controlled impedance 60 can take the form of a bipolar or a field-effect transistor that is biased or gated by the charging logic and power controller 64. The charging logic and power controller 64 can take the form of a microprocessor controlled device that senses the battery B voltage and charge current from the operational amplifiers 68 and 70 and provides appropriate control for the controlled impedance 60. An example of a microprocessor controlled device is disclosed in commonly assigned U.S. Pat. No. 4,392,101 entitled "Method of Charging Batteries and Apparatus Therefor" and U.S. Pat. No. 4,388,582 entitled "Apparatus and Method for Charging Batteries," the disclosures of which are incorporated herein by reference.

In operation, the power circuit 50 receives its operating power through a line cord 74 and plug 76 (FIGS. 1 and 4) from a conventional source, such as a 120 VAC 60 Hz supply. As shown in FIG. 4, operating power is provided directly to the coil of the relay K1 through connections A-A' and B-B' and to the voltage converter 100, which, in turn, provides power to the diode half-bridge 66 through outputs S and T.

When the plug 76 is disconnected from the power source, the coil of the relay K1 is in its unenergized state and the movable pole of the relay K1 makes contact with the contact NC to establish a circuit through the motor 22, the thermal switch 52, the ON/OFF switch 54, and the battery B. In this cordless operating mode, the motor 22 is driven by power stored in the battery B in response to operation of the ON/OFF switch 54.

When the vacuum cleaner 10 is operated in the cordless mode, the cord 74 is coiled and wrapped about support posts 80 which are mounted on the handle 14 of the vacuum cleaner 10 as illustrated in FIG. 1. The cord 74 is thus retained with the vacuum cleaner 10 for use during the corded mode while not interfering with the cordless mode of operation. When the plug 76 is connected to a power source, a current flow is established in the coil of the relay K1 to disconnect the movable pole from the contact NC and establish contact with the contact NO. In this latter circuit configuration, the aforementioned battery circuit is opened and a circuit is established between outputs P1 and P2 of the voltage converter 100 through the coil 57, the ON/OFF switch 54, the thermal switch 52, the motor 22, and the contact NO and the moveable pole of the contact set 56. The coil 57 and the capacitor 58 filter the output of the converter 100 appearing between the outputs P1 and P2 to provide a smooth DC voltage to the motor 22. In this corded operating mode, the motor 22 is driven by electrical power provided by the voltage converter 100 as explained below in relationship to FIG. 5.

When the power circuit 50 is in its corded mode, that is, the plug 76 is connected to a power source, the voltage converter 100 functions to provide source power to the diode half-bridge 66. The half-bridge 66, in conjunction with the converter 100, provides full-wave rectified DC to the charging logic and power controller 64. In response to voltage and current information provided through the operational amplifiers 68 and 70, the charging of the battery B, including fast charging, trickle charging, and maintenance charging, is controlled through the controlled impedance 60. In particular, when the power circuit 50 is in the corded mode, the controller 64 is placed in an operate mode. The battery B is then charged through a circuit which includes the output P2, the coil 57, the battery B, the resistor 62, the controlled impedance 60, the half-bridge 66, and the outputs S and T.

During the charge phase, charging current flows through the resistor 62 and is monitored by the operational amplifier 70. A signal representative of the instantaneous level of the charging current is fed from the operational amplifier 70 to the charging logic and power controller 64. When the sensed current reaches a preselected peak or upper level, the controller 64 gates the controlled impedance 60 to cause the charging current to decrease. When the decreasing charging current reaches a preselected lower level, the controller 64 gates the controlled impedance 60 to cause the charging current to increase. This pattern of charging continues for a preselected period as determined by the controller 64 at which time the controlled impedance 60 is gated to stop the flow of charging current.

The voltage level of the battery B is then observed by the controller 64 through the operational amplifier 68. If the desired voltage charge level has not been attained, the controlled impedance 60 is gated to reinitiate the supply of charging current in the manner described above and thereby continue the charging cycle. If the desired voltage has been attained, the controller 64 will gate the controlled impedance 60 to sustain sufficient current flow for a trickle level or maintenance level mode. In the alternative, the controlled impedance 60 could be gated to terminate the charging cycle when the battery B attains full charge.

It is noted that whenever the vacuum cleaner 10 is in the corded mode, the battery charging is enabled whether or not the motor 22 is operated in the corded mode and is functionally independent of motor control to insure that the battery B is charged when the user next selects the cordless mode of operation.

During the period when the battery B is being charged, charging current flows through the coil 57 thereby developing a field of stored energy about the coil. As noted above, the level of charging current is reduced periodically during the charging cycle, is very low during the trickle and maintenance modes, and may be reduced to zero when it is desired to terminate the charging cycle. During these periods of decreasing or termination of the charging flow, some or all of the stored energy will dissipate through the battery B and the diode 63 which is connected to form a circuit loop to provide a return path to the coil 57.

Also, during the corded mode when the motor 22 is being operated, the battery B may also be in a charge mode. Thus, current is being drawn from the voltage converter 100 through the coil 57 to supply both the motor 22 and the charging of the battery B thereby resulting in stored energy about the coil 57 related to this combination current. During the charging cycle, and at the end of the charging cycle, the charging current level decreases or drops to zero as noted above thereby resulting in decreases in the level of stored energy about the coil 57. While current continues to be supplied through the coil 57 to operate the motor 22, and thereby sustain a stored energy level attributable thereto, partial dissipation of the stored energy of the coil 57 will flow through the battery B and the diode 63 and return to the coil 57.

Therefore, the diode 63 provides a current path for dissipation of stored energy resulting from decreases in current levels associated with the battery charging cycle during the corded mode regardless of whether the motor 22 is operating or is not operating.

As illustrated in the circuit diagram of FIG. 5, the voltage converter 100 includes a bridge rectifier 102 formed by diodes 104, 106, 108, and 110. The plug 76 is connected by the power cord 74 to the bridge rectifier 102 and is connectable to a conventional AC source, for example, 120 volts at 60 Hz, that functions as a primary power source for the voltage converter 100. Electrical power for the coil of the relay K1 is provided through connections A-B as described above in relationship to FIG. 4. The output of the rectifier 102 is applied between a ground reference line 114 and a line 116. The rectified output is filtered by a capacitor 118 to thereby provide 150 volts DC between the lines 114 and 116. As an alternate to the AC power source, the lines 114 and 116 can be connected directly to a DC voltage source of 150 volts that would then be converted to the voltage required for the motor 22 and the battery charging function.

A pair of oscillation damping diodes 120 and 122 are connected in series between the lines 114 and 116. A voltage dropping resistor 123 network and a voltage-establishing Zener diode 125 are also connected in series between the lines 114 and 116.

The source and drain electrodes of a pair of N-channel power MOS field effect transistors 124 and 126 are connected in series between the lines 114 and 116 in the manner illustrated in FIG. 5. One side of a primary winding 132 of a high frequency, step-down transformer 134 is connected through a line 136 to a node 138 between the diodes 120 and 122. The other side of the primary winding 132 is connected to a node 140 between the drain electrode of the transistor 124 and the source electrode of the transistor 126.

The outside terminals of a center-tapped secondary winding 142 of the transformer 134 are connected to the anodes of rectifier diodes 144 and 146. The cathodes of diodes 144 and 146 are each connected to the output P2 of the voltage converter 100 while the center tap of the secondary winding 142 is connected to the output P1. As discussed above in connection with FIG. 4, the outputs P2 and P1 are connected, respectively, through the coil 57 to the negative side of the battery B and to the contact NO of the contact set 56. Also, outputs S and T are connected directly across the full secondary winding 142 of the transformer 134. In this manner, the half-bridge 66 (FIG. 4) of the power circuit 50, which is connected to outputs S and T, cooperates with the diodes 144 and 146 to provide full wave rectification of the alternating output of the secondary winding 142. This full-wave rectified voltage is applied between output P2 of the converter 100 and chassis ground as illustrated in FIG. 4 to provide the power associated with the charging of the battery B and the control thereof as previously described.

During operation of the voltage converter 100, AC voltage is applied to the converter 100 through the plug 76 and cord 74 with the bridge rectifier 102 developing a pulsating DC voltage between the ground reference line 114 and the line 116. The pulsating DC voltage is filtered by the capacitor 118 to provide, for example, 150 volts DC between the lines 114 and 116 with an input of 120 volts AC at a frequency of 60 Hz. A DC voltage is developed across the Zener diode 125 which is applied to and facilitates operation of an oscillator 154 that operates at a frequency of about 25 KHz, that is, a rate between 350 and 600 times the input AC frequency, and produces an alternating voltage in the form of a square wave which appears at the node 156. The oscillator 154 includes a CMOS astable RC timer defined by a self-contained chip, for example, of the type identified as an ICM 7555 chip available from Intersil, Inc. of Cupertino, CA 95014. During initial operation of the voltage converter 100, the capacitor 158 provides a soft start for the oscillator 154 which permits the capacitor 152 to gradually charge from zero volts to a desired peak level. An RC network, including a resistor 160 and a capacitor 162, is connected to the oscillator 154 and establishes the frequency of operation of the oscillator 154 and the voltage converter 100.

The use of a voltage converter operating at a high-frequency, e.g., 25 KHz, allows the use of physically compact and lightweight components, especially voltage converting transformers, so that a converter, such as the converter 100, can be provided that has a physical envelop that is desirably small and yet provide charging current required to recharge the battery B.

During one half cycle of each square wave output of the oscillator 154, the output at the node 156 is high and is applied through a resistor 164 to the gate electrode of the transistor 124 to bias the transistor to its ON state. Current then flows in a first or charging direction through the capacitor 152, through the primary winding 132 and through the source and drain electrodes of the transistor 124. During this half cycle of each square wave, the AC source and the rectified and filtered output thereof functions as a primary power source for the transformer 134. As current flows in the first or charging direction through the primary winding 132, a voltage is induced in the secondary winding 142. The output of the transformer 134 is rectified by the diodes 144 and 146 and is applied through the outputs P1 and P2 in the manner previously described with respect to the power circuit 50 as illustrated in FIG. 4. Also, during this half cycle of operation, when current flows in the first or charging direction, the capacitor 152 charges to a specific voltage level.

When the output of the oscillator 154 is high and during this half cycle of each square wave, a N-channel power MOS field effect transistor 166 is biased to its ON state and, through its drain and source electrodes, connects the ground reference line 114 to the gate electrode of a N-channel power MOS field effect transistor 168. The connection of the ground reference line 114 to the gate electrode of the transistor 168 insures that the transistor 168 and the transistor 126 will not turn ON when the transistor 124 is in its ON state. When the transistor 124 is turned ON, a charging path is formed that includes a diode 170, a capacitor 172, and the source and drain electrodes of the transistor 124 to charge the capacitor 172 essentially to the voltage level appearing between the lines 114 and 116.

During the next half cycle of each square wave output of the oscillator 154, the output of the oscillator 154 goes low and the transistors 124 and 166 are biased to their OFF state to disconnect the ground reference line 114 from the gate electrode of the transistor 168. At this time, the transistor 124 then quickly discharges through a diode 173 that is connected in parallel with the resistor 164. Also, the charging path for the capacitor 172 is opened, and the capacitor 172 is precluded from discharging through the charging path by the inverse connection of the diode 170. At this time, the capacitor 172 begins to discharge slowly through a path which includes gating resistors 174 and 176, and the gate and source electrodes of the transistor 168. The resultant current flow through the gate-source circuit of the transistor 168 causes the transistor 168 to turn ON. The capacitor 172 then begins to discharge more rapidly through a path which includes a parallel combination of a capacitor 178 and a resistor 180, the source and drain electrodes of the transistor 168, a pair of current limiting resistors 182 and 184, and the gate and source electrodes of the transistor 126.

The capacitor 178 is a very low-valued capacitor while the resistor 180 is of a relatively high resistance value. This combination of RC values permits rapid current flow initially through the capacitor 178 until the low-valued capacitor is nearly fully charged after which current flows more slowly through the resistor 180. The initial rapid current flow through the discharge path of the capacitor 172, which includes the capacitor 178 and the transistor 126, causes the transistor 168 to turn ON rapidly. A Zener diode 186 is designed to break down at the operating voltage level of the transistor 126 and thereby prevents any potentially harmful application of voltage to the transistor 126, above the operating voltage level.

Thus, the capacitor 172 functions as a tertiary power source for the voltage converter 100 and powers the operation of the transistor 126. With respect to the charging of the capacitor 172, the transistors 124 and 166, and the components in the charging path of the capacitor function as a means for facilitating the development of the voltage of the tertiary power source. Further, the shut down of the transistor 166, the turn ON of the transistor 168, and all of the components associated with the discharge of the capacitor 172 form a means for applying the voltage of the tertiary power source, i.e., the capacitor 172, to turn ON the transistor 126. The transistor 126 will remain in its ON state until the transistor 166 is again turned ON and the ground reference line 114 is connected thereby to the gate electrode of the transistor 168. At this time, the capacitor 172 begins to charge as described above and the transistor 126 begins to discharge. The discharge path for the transistor 126 includes the resistors 182 and 184, a Zener diode 188, and the source and drain electrodes of the now-conducting transistors 124 and 166. The Zener diode 188 insures that the discharging current of the transistor 126 will not flow through the gate-source circuit of the transistor 168 and thereby prevents potential damage to the transistor 168.

The transistors 166 and 168, along with the other elements in the biasing control circuit for the transistor 126, form a power buffer, indicated generally by the reference character 190. Thus, while the bias control for the operation of the transistor 124 is derived directly through the oscillator 154, the bias control for the operation of the transistor 126 is derived indirectly through the oscillator 154 and directly through the power buffer 190 which includes a tertiary or separate power source, namely, the charged capacitor 172.

During the next half cycle of each square wave output of the oscillator 154, when the output is low, the transistor 124 is turned OFF and the transistor 126 is turned ON. In this mode, the primary winding 132 is now connected in a closed series loop which includes the source and drain electrodes of the transistor 126 and the capacitor 152. At this time, the capacitor 152 begins to discharge to supply current in the closed series loop. This current flows in a second or discharging direction through the primary winding 132 of the transformer 134, which is in a direction opposite to that when the transistor 124 was conducting. In this mode, then, the capacitor 152 functions as a secondary power source for the transformer 134 whereby a voltage is induced in the secondary winding 142. During this period, the output of the transformer 134 is rectified by the diodes 144 and 146 and is applied through the outputs P1 and P2. Assuming the ON/OFF switch 54 is closed, operating power is applied to the motor 22 to operate the vacuum cleaner 10, as discussed above.

Thus, during alternate operation of the transistors 124 and 126 and during successive half-cycles of the square wave output of the oscillator 154, current flows alternately in opposite directions through the primary winding 132 at a relatively high frequency determined solely by the frequency of the oscillator 154 of the sensing and control circuit. The use of a voltage converter operating at a high-frequency, e.g., 25 KHz, allows the use of physically compact and lightweight components, especially voltage converting transformers, so that a voltage converter 100 can be provided for the internal battery charger to provide the current required to charge the battery B during the corded mode without compromising the utility of the illustrative vacuum cleaner 10.

As noted above, 150 volts DC appears between the lines 114 and 116. During the conduction of the transistor 124, the voltage between the lines 114 and 116 is effectively split between the primary winding 132 and the capacitor 152 whereby the capacitor charges, theoretically, to a level of 75 volts. The remaining 75 volts is applied across the primary winding 132 which voltage is then stepped down in value by the split secondary winding 142.

During the mode when the transistor 126 is conducting, the capacitor 152 is the power source for the transformer 134. Since the capacitor 152 has been charged to a level of 75 volts during the previous half cycle of the square wave output of the oscillator 154, this voltage level is effectively applied to the primary winding 132 and is the same voltage level applied to the primary winding during the previous half cycle.

Thus, the same level of voltage, but of opposite polarity, is applied to the primary winding 132 during alternate half cycles of the square wave output of the oscillator 154. In this manner, a high frequency signal is applied to the primary winding 132 which is stepped-down by the transformer 134 and rectified by the diodes 144 and 146 to provide the desired DC voltage at the output terminals P1 and P2.

A resistor 192 and a capacitor 194 are connected in parallel with the source and drain electrodes of the transistor 124 and function as a snubber circuit to provide a bypass around the transistor 124 for any spurious voltage spikes which may occur and which could possibly damage the transistor 124. Similarly, a resistor 196 and a capacitor 198 are connected in parallel with the source and drain electrodes of the transistor 126 and function as a snubber circuit for the transistor 126.

Thus, when the vacuum cleaner 10 is operated in its corded mode, the voltage converter 100 functions to provide power for the motor 22 through the circuit path S and T to provide power to the battery charger circuitry as discussed above, and, when the vacuum cleaner 10 is operated in its cordless mode, electrical power is provided directly through the battery B.

If an overcurrent situation occurs in the output of the transformer 134 when the transistor 124 is ON, e.g., a short-circuit or overload condition in the motor 22, of the vacuum cleaner 10, the inductive impedance of the transformer 134 becomes extremely small and the capacitor 152 will charge quickly to the level of the supply voltage (150 volts) between the lines 114 and 116. The magnitude of the field about the inductive circuit presented by the transformer 134 under these conditions is significantly large and seeks to keep the current flowing in the same direction by virtue of the stored energy in the magnetic field. Normally, this condition would cause the capacitor 152 to charge to an even higher voltage level and would start the circuit into an undesirable oscillation mode, thereby saturating the transformer 134.

In order to prevent this overload induced oscillation with the transistor 124 biased to its ON state, the current resulting from the stored energy of the magnetic field of the inductive circuit of the transformer 134 is directed through a loop which includes the drain and the source electrodes of the transistor 124, a diode 122, and the primary winding 132 of the transformer 134. The resulting current continues in this loop until the field has completely dissipated. During this time, the charge on the capacitor 152 remains at the supply voltage level (150 volts) and any tendency for oscillations are damped to preclude any catastrophic event during the period when the transistor 124 is in its ON state.

When the transistor 124 is switched to its OFF state and the transistor 126 is switched to its ON state during the overload or short circuit condition, the capacitor 152 is now in a closed loop with the transformer inductance and the drain and source electrodes of the transistor 126. The capacitor 152 remains charged to the level of the previous charge (150 volts) which is the charge achieved during the period when the transistor 124 was in its ON state. Due to the low impedance in the inductive circuit of the transformer 134, the previously charged capacitor 152 discharges rapidly through the low impedance to essentially zero volts. As the capacitor 152 discharges rapidly, a magnetic field is developed rapidly about the transformer inductance. When the capacitor 152 is fully discharged, the stored energy of the field about the transformer 134 tends to maintain current flow in the same direction as when the capacitor 152 was discharging; the continued current flow normally charging the capacitor 152 in the negative direction. With the capacitor 152 charged in the negative direction, the power supply and the negative charge on the capacitor 152 would then be in a cumulative arrangement to provide a total voltage which greatly exceeds 150 volts when the transistor 124 is again biased to its ON state.

This condition would again lead to a catastrophic event because of the significant voltage level which would lead to the saturation of the transformer 134 and the resultant destruction of circuit components. A diode 120 is connected in a parallel circuit with the capacitor 152 to preclude the reverse charging of the capacitor 152. After the capacitor 152 has been fully discharged, the current resulting rom the stored energy of the magnetic field of the transformer 134 will seek the least-impedance path and pass through the diode 120 to bypass the capacitor 152. Eventually, the stored energy is fully dissipated and a steady-state condition attained for the remainder of the period when the transistor 126 is in its ON state.

Thus, by connecting the diodes 120 and 122 in the voltage converter 100, undesirable oscillations in the converter are precluded when a short circuit or overload occurs in any load, such the motor 22 connected to the output of the transformer 134.

Further details as to the operation of the voltage converter 100 are disclosed in the afore-referenced U.S. patent application Ser. No. (Black & Decker Case 4787), filed on even date herewith and entitled "Voltage Converter," the disclosure of which is incorporated herein by reference thereto. The voltage converter 100 initially converts the low frequency input to a high level DC voltage, then to a high frequency voltage level which is thereafter effectively transformed and rectified to the lower voltage supply level of the motor 22. The transformer 134 is a high frequency transformer which is lightweight and compact, particularly when compared with the weight and size of a transformer used in low frequency applications such as, for example, at 50 Hz or 60 Hz.

In addition, the voltage converter 100 is desirably designed with a comparatively small number of components while providing an efficient conversion process. This further enhances the lightweight, compact features of the voltage converter 100. The size of the voltage converter 100 further permits the use of an internal battery charger in a wide range of power-operated devices.

The vacuum cleaner 10 is merely illustrative of one example of many power-operated, corded/cordless mode devices which become more versatile because of the inventive dual mode capability. Other examples of power-operated devices which are enhanced by the inventive dual mode capability include, but are not limited to, drills, screwdrivers, screwdriver-drills, hammer drills, jig saws, circular saws, hedge trimmers, grass shears, lawn mowers, as well as battery-operated household products and the like.

As will be apparent to those skilled in the art, various changes and modifications may be made to the illustrated corded/cordless dual-mode power-operated device of the present invention without departing from the spirit and scope of the invention as determined in the appended claims and their legal equivalent.

What is claimed is:

1. A corded/cordless dual-mode power-operated device, comprising:
   an electrically powered device having a motor therein operable in a preselected voltage range;
   a rechargeable battery for storing electrical energy for operating said motor;
   battery charger means for charging said battery;
   voltage converter means for providing conditioned electrical power to said battery charger to effect charging of said battery;
   circuit means having a power cord for connection to a source of electrical energy therethrough and in circuit with said motor, said battery, said voltage converter means, and said battery charger for providing a circuit between said battery and motor when said power cord is disconnected from the source of electrical energy and for providing a circuit, when said power cord is connected to the source of electrical energy, between said power cord and said motor and for providing power to said voltage converter to effect charging of said battery; and wherein the source of electrical energy is an alternating voltage at a first frequency and said voltage converter means converts the first-frequency alternating voltage into an alternating voltage at a second frequency and converts the second-frequency alternating voltage to a lower voltage.

2. The corded/cordless dual-mode power-operated device of claim 1, wherein said circuit means provides a circuit, when said power cord is connected to a source of electrical energy, between said power cord and said motor through said voltage converter.

3. The corded/cordless dual-mode power-operated device of claim 1, wherein said circuit means comprises a relay having a coil connected to said power cord and a contact set for facilitating the connecting of said motor to said battery when the power cord is disconnected from a power source and for connecting said voltage converter to said motor when said power cord is connected to a power source.

4. The corded/cordless dual-mode power-operated device of claim 1, wherein the second frequency alternating voltage is suitable for driving said motor.

5. The corded/cordless dual-mode power-operated device of claim 1, wherein the second frequency alternating voltage is suitable for use in charging said battery.

6. The corded/cordless dual-mode power-operated device of claim 1, wherein said voltage converter further comprises a step-down transformer for stepping down the voltage of the second-frequency alternating voltage.

7. The corded/cordless dual-mode power-operated device of claim 1, wherein the frequency of the second-frequency alternating voltage is between 350 and 600 times the frequency of the first-frequency alternating voltage.

8. The corded/cordless dual-mode power-operated device of claim 7, wherein the second frequency is approximately 25 KHz.

9. The corded/cordless dual-mode power-operated device of claim 7, wherein the first frequency is between 50 and 60 Hz.

10. The corded/cordless dual-mode power-operated device of claim 7, wherein said voltage converter means further comprises:

means for rectifying the stepped down second-frequency alternating voltage of said step-down transformer.

11. The corded/cordless dual-mode power-operated device of claim 7, wherein said voltage converter means further comprises:

means for rectifying the stepped down second-frequency alternating voltage of said step-down transformer to provide a rectified voltage of between 3.6 and 48 volts to said motor.

* * * * *